(12) United States Patent
Bade et al.

(10) Patent No.: US 11,697,420 B2
(45) Date of Patent: Jul. 11, 2023

(54) METHOD AND DEVICE FOR EVALUATING A DEGREE OF FATIGUE OF A VEHICLE OCCUPANT IN A VEHICLE

(71) Applicant: Bayerische Motoren Werke Aktiengesellschaft, Munich (DE)

(72) Inventors: Florian Bade, Munich (DE); Moritz Blume, Munich (DE); Martin Buchner, Munich (DE); Carsten Isert, Munich (DE); Julia Niemann, Berlin (DE); Michael Wolfram, Poing (DE); Joris Wolters, Amersfoort (NL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 336 days.

(21) Appl. No.: 16/751,297

(22) Filed: Jan. 24, 2020

(65) Prior Publication Data
US 2020/0156649 A1    May 21, 2020

Related U.S. Application Data

(63) Continuation of application No. PCT/EP2018/074529, filed on Sep. 12, 2018.

(30) Foreign Application Priority Data

Sep. 25, 2017 (DE) .................... 10 2017 216 875.7

(51) Int. Cl.
*B60W 40/08* (2012.01)
*G06N 20/00* (2019.01)
*G06V 20/59* (2022.01)

(52) U.S. Cl.
CPC ............. *B60W 40/08* (2013.01); *G06N 20/00* (2019.01); *G06V 20/597* (2022.01);
(Continued)

(58) Field of Classification Search
CPC ........... G06K 9/00832; G06K 9/00845; G06K 2009/00939; G06K 2209/29
See application file for complete search history.

(56) References Cited

U.S. PATENT DOCUMENTS

| 7,487,692 B2 | 2/2009 | Lin et al. |
| 2003/0151516 A1 | 8/2003 | Basir et al. |

(Continued)

FOREIGN PATENT DOCUMENTS

| CN | 102509418 A | 6/2012 |
| CN | 104973054 A | 10/2015 |

(Continued)

OTHER PUBLICATIONS

International Search Report (PCT/ISA/210) issued in PCT Application No. PCT/EP2018/074529 dated Nov. 21, 2018 with English translation (six (6) pages).

(Continued)

*Primary Examiner* — Benyam Haile
(74) *Attorney, Agent, or Firm* — Crowell & Moring LLP

(57) ABSTRACT

A method evaluates a degree of fatigue of a vehicle occupant in a vehicle. A number of first fatigue indicators is provided which are determined according to computation rules from a plurality of first sensor values and each represent a degree of fatigue of the vehicle occupant. The first sensor values represent measured values of the vehicle and/or measured values relating to a current journey. A first metadata record is associated with each of the number of first fatigue indicators, wherein the first metadata records represent information about the characteristics of the sensors. The first sensor values are processed in the respective first fatigue indicators. A number of second fatigue indicators is provided which are determined according to computation rules from one or more second sensor values and each represent a degree of fatigue of the vehicle occupant. The second (Continued)

sensor values represent physiological and/or physical parameters of the vehicle occupants. A second metadata record is associated with each of the number of second fatigue indicators. The second metadata records represent information about the characteristics of the sensors. The second sensor values are processed in the respective second fatigue indicators. An overall fatigue indicator is determined which represents the degree of fatigue of the vehicle occupant by weighting the number of first fatigue indicators and the number of second fatigue indicators. The fatigue indicators are weighted according to the information about the characteristics of the sensors contained in the first metadata record and the second metadata record.

11 Claims, 1 Drawing Sheet

(52) U.S. Cl.
CPC ............... *B60W 2040/0827* (2013.01); *B60W 2040/0872* (2013.01); *B60W 2540/221* (2020.02); *B60W 2540/229* (2020.02)

(56) References Cited

U.S. PATENT DOCUMENTS

| | | |
|---|---|---|
| 2015/0314681 A1 | 11/2015 | Riley, Sr. et al. |
| 2016/0001781 A1* | 1/2016 | Fung .................. G07C 9/37 701/36 |
| 2016/0354027 A1 | 12/2016 | Benson et al. |

FOREIGN PATENT DOCUMENTS

| | | |
|---|---|---|
| CN | 106361357 A | 2/2017 |
| DE | 10 2011 109 564 A1 | 2/2013 |

OTHER PUBLICATIONS

German-language Written Opinion (PCT/ISA/237) issued in PCT Application No. PCT/EP2018/074529 dated Nov. 21, 2018 (seven (7) pages).

German-language Search Report issued in counterpart German Application No. 10 2017 216 875.7 dated Jun. 20, 2018 with partial English translation (14 pages).

English-language Chinese Office Action issued in Chinese application No. 201880039998.2 dated May 20, 2022 (Five (5) pages).

* cited by examiner

METHOD AND DEVICE FOR EVALUATING A DEGREE OF FATIGUE OF A VEHICLE OCCUPANT IN A VEHICLE

CROSS REFERENCE TO RELATED APPLICATIONS

This application is a continuation of PCT International Application No. PCT/EP2018/074529, filed Sep. 12, 2018, which claims priority under 35 U.S.C. § 119 from German Patent Application No. 10 2017 216 875.7, filed Sep. 25, 2017, the entire disclosures of which are herein expressly incorporated by reference.

BACKGROUND AND SUMMARY OF THE INVENTION

The invention relates to a method and a device for evaluating a degree of fatigue of a vehicle occupant, in particular a driver, in a vehicle.

Techniques are known in which a check is carried out, for example on the basis of a steering behavior and a driving time of a driver in a motor vehicle, possibly in combination with a time of day, a type of route or a circadian rhythm, in order to determine whether there is fatigue of the driver, which is characterized by the degree of fatigue. However, the situation may occur in which the indicators mentioned above are not sufficiently accurate for safely and reliably monitoring the degree of fatigue. Hazardous situations for the driver and for further road users may result therefrom. Increased fatigue, that is to say an increased degree of fatigue, may result, in particular, if assistance is provided by one or more driver assistance systems. For example, the degree of fatigue of the driver can be increased to a particularly severe extent in connection with automatic or autonomous driving techniques. However, it may also be desirable or necessary for the driver to have a low degree of fatigue in those scenarios in which the driver is extensively assisted by one or more driver assistance systems.

The degree of fatigue of a driver can also be evaluated on the basis of video cameras which monitor the driver. For example, a period for which an eyelid of the driver is closed (so-called lid closure time) can be monitored by means of image-based methods. The lid closure time is that time for which the eyelid remains in the closed state. Micro-sleep of the driver, for example, can be determined in this manner and, as a result, the degree of fatigue can be determined in a comparatively accurate manner.

However, such techniques are comparatively inflexible. The situation may occur in which an increased degree of fatigue is determined on account of an extended lid closure time even though the driver is paying appropriate or situationally adapted attention to the driving situation.

There is therefore a need for improved techniques for evaluating the degree of fatigue of the driver. In particular, these techniques are intended to make it possible to monitor the degree of fatigue of the driver in a flexible and situationally adapted manner.

DE 10 2011 109 564 A1 discloses, for example, a method for monitoring at least one vehicle occupant in a vehicle, in which a current vital parameter value of at least one vital parameter of the vehicle occupant and possibly a current environmental parameter value of at least one environmental parameter of an external environment of the vehicle are determined. The current vital parameter value is stored together with the current environmental parameter value and is compared with at least one older vital parameter value of the vehicle occupant which has already been stored and was possibly stored together with an older environmental parameter value which corresponds to the current environmental parameter value. The vital parameter value is determined by evaluating images of the vehicle occupant which are captured by means of an image capture unit. This may be, for example, a pulse rate or heart rate and/or a breathing rate and/or a breathing volume. The environmental parameter value is to analyze the determined vital parameter values in a context-based manner. Environmental parameter values are, for example, a current position of the vehicle.

The object of the present invention is to provide a method and a device which increase the robustness of the evaluation of the degree of fatigue of a vehicle occupant, in particular the driver of the vehicle.

This object is achieved by way of a method, a computer program product and a device, in accordance with the claimed invention.

A method for evaluating a degree of fatigue of a vehicle occupant, in particular a driver, in a vehicle is provided, which method comprises the following steps:

(i) Providing a number of first fatigue indicators which are determined from a plurality of first sensor values according to one or more calculation rules and each represent a degree of fatigue of the vehicle occupant, wherein the first sensor values represent measured values of the vehicle and/or measured values relating to a current journey. The number of first fatigue indicators may be 1 or greater. A first fatigue indicator can be determined from a single first sensor value according to a calculation rule. A first fatigue indicator can alternatively be determined from a plurality of first sensor values according to a calculation rule. If a plurality of first fatigue indicators are provided, these can be determined in any desired combination according to the variants mentioned above. The first sensor values may be measured values of the vehicle, for example a steering angle, a steering frequency, a triggering frequency of a driver assistance system, a frequency of a change in the speed of the vehicle, a frequency of actuation of pedals of the vehicle, an accuracy with which the driver follows a lane, a temporal profile of actuation of the steering system of the vehicle, a steering angle, a profile of the steering angle, a steering angle speed or a steering torque. A measured value relating to a current journey is understood as meaning, in particular, driving situation parameters, for example a driving time (driving duration), a time of day, a type of route, a circadian rhythm and the like.

(ii) Assigning a respective first metadata record to the number of first fatigue indicators, wherein the first metadata records represent an item of information relating to the characteristics of the sensors, the first sensor values of which are processed in the respective first fatigue indicators. In other words, a first metadata record is assigned to each first fatigue indicator, in particular. A respective first metadata record can comprise one or more metadata items. An item of information relating to the characteristics of the sensors may comprise, for example, an availability of a sensor value and/or an accuracy with which a sensor value is captured. The quality of a respective first fatigue indicator can therefore be indicated with the aid of a first metadata record which is assigned to a first fatigue indicator.

(iii) Providing a number of second fatigue indicators which are determined from one or more second sensor values according to one or more calculation rules and each represent a degree of fatigue of the vehicle occupant, wherein the second sensor values represent physiological and/or physical parameters of the vehicle occupant. A second fatigue indicator can be determined from one second sensor value according to a calculation rule. Alternatively, a second fatigue indicator can be determined from a plurality of second sensor values. If a plurality of second fatigue indicators are provided, they can be determined in any desired combination according to the variants mentioned above. The second sensor values represent, in particular, those parameters which are determined, for example, by evaluating images of the vehicle occupant which are captured by means of at least one image capture unit. In the further sense in particular, the second sensor values are current vital parameter values of the vehicle occupant whose degree of fatigue is intended to be evaluated. Second sensor values may be, for example, a pulse rate, a breathing rate, a breathing volume, a heart rate variability, a skin temperature, a pumping capacity of the heart, a blood pressure, an oxygen concentration in the blood of the vehicle occupant (also referred to as oxygen saturation), an autonomous bodily function and the like. The second sensor values can be captured using sensors of the vehicle and/or sensors which are worn by the vehicle occupant on his body, for example a wearable (smartwatch, fitness tracker, heart rate sensor, pacemaker and the like).

(iv) Assigning a respective second metadata record to the number of second fatigue indicators, wherein the second metadata records represent an item of information relating to the characteristics of the sensors, the second sensor values of which are processed in the respective second fatigue indicators. In particular, a second metadata record is assigned to each second fatigue indicator. A respective second metadata record may comprise one or more metadata items which each or in combination represent the information relating to the characteristics of the sensors, the second sensor values of which are processed in the respective second fatigue indicators. In particular, these may be an availability of a sensor value and/or an accuracy of the sensor value at the time at which it is captured. A qualitative evaluation of a respective second fatigue indicator is therefore enabled.

(v) Determining a fatigue indicator representing the degree of fatigue of the vehicle occupant by weighting the number of first fatigue indicators and the number of second fatigue indicators, wherein the weighting is carried out on the basis of the information relating to the characteristics of the sensors which is contained in a first metadata record and the second metadata record. In particular, the first or second fatigue indicator is respectively weighted by means of a weighting factor determined from the first or second metadata record assigned to it. In other words, a respective weighting parameter is determined from the information relating to the characteristics of the sensors which is contained in the first metadata record and the second metadata record, which weighting parameter is processed for the purpose of weighting the assigned first or second fatigue indicator. The overall fatigue indicator representing the degree of fatigue of the vehicle occupant is then determined therefrom.

As a result, the robustness of the evaluation of the degree of fatigue of the vehicle occupant can be increased. The procedure is based on the consideration that the first sensor values, which represent measured values of the vehicle and/or measured values relating to a current journey, provide only limited information on the actual attentiveness of the vehicle occupant even though the first sensor values are accurate data owing to their principle. In contrast, although the second sensor values, which represent physiological and/or physical parameters of the vehicle occupant, are more difficult to capture, they provide direct information on the attentiveness of the vehicle driver. The accuracy of the evaluation of the degree of fatigue can be increased by combining and weighting respective fatigue indicators.

According to one expedient configuration, the number of first fatigue indicators are weighted with the respectively assigned first metadata record and the number of second fatigue indicators are weighted with the respectively assigned second metadata record by determining a weighting factor from the information in a respective metadata record. This weighting factor makes it possible to weight each fatigue indicator to a greater or lesser extent according to the quality of its sensor values in order to improve the evaluation of the degree of fatigue of the vehicle occupant overall.

Another expedient configuration provides for the first metadata records and/or the second metadata records to represent an item of information relating to the accuracy and/or availability of the determined first and/or second sensor values. In principle, all those metadata which are suitable for being able to evaluate the characteristics of the sensors, the sensor values of which are processed in the respective fatigue indicators, with respect to their quality also come into consideration for use in a metadata record.

It is expedient if the weighting is selected to be greater, the higher the accuracy and/or availability of the first and/or second sensor values. In particular, the weighting can also be adapted at the runtime of the method. This makes it possible to continuously improve the evaluation of the degree of fatigue of the vehicle occupant. In particular, it is possible to store the first and/or second metadata records, which are assigned to respective first and/or second fatigue indicators, in a memory of the vehicle and to adapt them, that is to say optimize them, adaptively over time. Initially, the first and/or second metadata records can be provided with a priori expert knowledge for determining the weighting factors. The weighting can then be adaptively improved by carrying out the method at the runtime.

It is also expedient if a personal profile determined for the vehicle occupant is included in the weighting. This can be carried out, in particular, by generating and processing personalized second metadata records by capturing and assessing the second sensor values over time. If, for example, a low heart rate generally indicates a higher degree of fatigue of a vehicle occupant, a determined higher or lower heart rate typical of the person can be taken into account, by considering a personal profile, when evaluating a low heart rate captured by means of sensors.

It is also expedient if a first and/or a second sensor value is/are additionally processed when determining the overall fatigue indicator from the weighted first and second fatigue indicators. This makes it possible to improve the merging of the different fatigue indicators even more. At the same time, the reactivity of the method can be increased by means of this approach known under the name "pipelining".

The above-mentioned advantages can also be achieved in another configuration in which the overall fatigue indicator is assigned to a classification value according to a predetermined scheme, wherein the classification value is verified and optionally adapted by means of further assessment of a first and/or a second sensor value.

According to one configuration, the overall fatigue indicator can be determined by means of a rule-based method. In another configuration, the overall fatigue indicator can be determined by means of a method based on machine learning, wherein a priori expert knowledge is initially used, in particular, to carry out the weighting on the basis of respective metadata records.

The invention also provides a computer program product which can be loaded into the internal memory of a digital computer and comprises software code sections which are used to carry out the steps according to the method described herein when the product runs on a computer. In the present case, the computer may be a computing unit of the vehicle. The computer program product can be embodied on a CD-ROM, a DVD, a USB memory stick and the like. The computer program product may also be in the form of a signal which can be loaded via a contact-based or contactless network.

The invention also provides a device for evaluating a degree of fatigue of an occupant in a vehicle, which is distinguished by the fact that the device comprises a computing unit which is designed to carry out the method described in this description.

The device according to the invention has the same advantages as were described in connection with the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
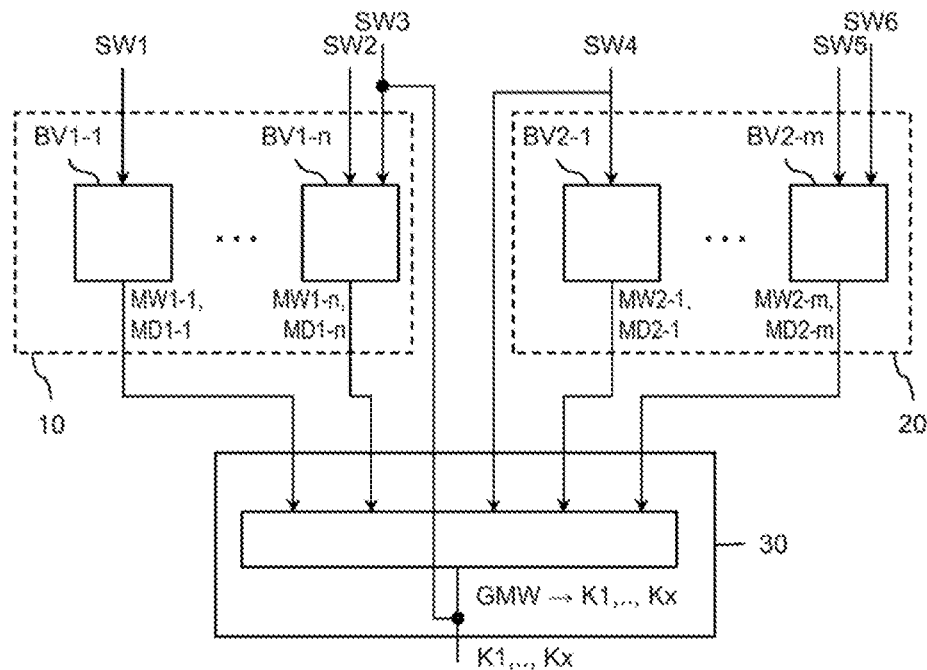
FIG. 1 is a schematic illustration of the sequence of an exemplary method according to the invention.

FIG. 1 shows a schematic illustration of the sequence of the method for evaluating a degree of fatigue of a vehicle occupant, in particular a driver, in a vehicle. The method is carried out in a vehicle which is not illustrated in any more detail in the figures. In a known manner, the vehicle has a steering wheel and another control element for influencing the lateral guidance, a gas pedal and a brake lever or corresponding control elements for longitudinal guidance, and a plurality of sensors for capturing measured values of the vehicle and/or measured values relating to a current journey of the vehicle.

Measured values which are provided by the sensors and represent first sensor values SW1, SW2, SW3 in FIG. 1 are, for example, a steering angle, a profile of the steering angle, a steering angle speed, a steering torque, a temporal profile of actuation of the steering system of the vehicle, an accuracy with which the driver follows a lane and the like. This group of first sensor values also includes driving situation parameters, that is to say parameters relating to a current journey, for example a driving time (driving duration), a time of day, a triggering frequency of a driver assistance system, a frequency of a change in the speed of the vehicle, a frequency of actuation of pedals of the vehicle, an ambient brightness, a type of route, a circadian rhythm and the like. The group of first sensor values can also include further or other driving situation parameters or parameters of the vehicle.

Each of the sensor values SW1, SW2, SW3 is determined and provided by a corresponding sensor of the vehicle. Alternatively, the first sensor value SW1, SW2, SW3 can be provided by a computing unit of the vehicle, for example a control unit, in which case it forms the result of processing by this computing unit. A sensor value can likewise be received from outside the vehicle, for example an item of weather information.

The first sensor values SW1, SW2, SW3 are processed according to one or more calculation rules BV1-1, ..., BV1-$n$, wherein the result of the processing is a respective first fatigue indicator MW1-1, ..., MW1-$n$. The calculation rules BV1-1, ..., BV1-$n$ are, for example, software components which process the first sensor value(s) SW1, SW2, SW3 supplied to them in an intended manner to form a respective first fatigue indicator MW1-1, ..., MW1-$n$.

Only two calculation rules BV1-1 and BV1-$n$ are explicitly illustrated only by way of example in the present exemplary embodiment in the computing unit 10 processing the calculation rules BV1-1, ..., BV1-$n$. Any desired number n of calculation rules BV1-1, ..., BV1-$n$ can be carried out on the computing unit 10. This means that the number n may be 1 or greater. In FIG. 1, a single first sensor value SW1, for example, is supplied to the calculation rule BV1-1 for processing. The calculation rule BV1-1 processes the first sensor value SW1 and determines the first fatigue indicator MW1-1 therefrom. In contrast, two first sensor values SW2, SW3, for example, are supplied to the calculation rule BV1-$n$ for processing and for determining the first fatigue indicator MW1-$n$. It goes without saying that any desired number of different sensor values can be supplied to a respective calculation rule BV1-1, ..., BV1-$n$. It is likewise possible to supply a particular sensor value SW1, SW2, SW3 not only to one of the calculation rules BV1-1, ..., BV1-$n$ but rather to a plurality of the calculation rules BV1-1, ..., BV1-$n$ for processing.

Figure 2:
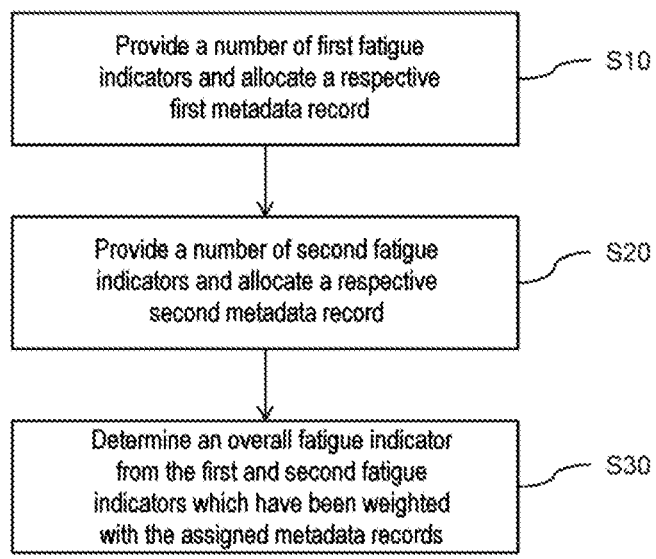
FIG. 2 shows a sequence of the exemplary method according to the invention for evaluating a degree of fatigue of a vehicle occupant, in particular a driver, in a vehicle.

In addition to providing a respective first fatigue indicator MW1-1, ..., MW1-$n$, the respective calculation rules BV1-1, ..., BV1-$n$ provide a respective first metadata record MD1-1, ..., MD1-$n$ assigned to the first fatigue indicator MW1-1, ..., MW1-$n$. This corresponds to method step S10 in the sequence in FIG. 2.

A respective first metadata record MD1-1, ..., MD1-$n$ comprises one or more items of information relating to the characteristics of the sensors, in particular an item of information relating to the availability of a sensor value and/or accuracy of the first sensor values SW1, SW2, SW3 at the time at which they are captured. The "quality" of the fatigue indicators MW1-1, ..., MW1-$n$ determined by means of the calculation rules BV1-1, ..., BV1-$n$ can therefore be evaluated on the basis of the information contained in the first metadata records MD1-1, ..., MD1-$n$. Whereas the sensor values SW1, SW2, SW3 are precise data, they provide only limited information on the actual degree of fatigue of the vehicle occupant and are therefore referred to as indirect parameters.

In order to improve the accuracy of the evaluation of the degree of fatigue of the vehicle occupant, second sensor values SW4, SW5, SW6 are therefore processed by a computing unit 20. The second sensor values SW4, SW5, SW6 represent physiological and/or physical parameters of the vehicle occupant. The second sensor values can be determined, for example, by evaluating images of the vehicle occupant which are captured using at least one image capture unit. The second sensor values SW4, SW5, SW6 include, for example, a pulse rate, a breathing rate, a breathing volume, a heart rate variability, a skin temperature, a pumping capacity of the heart, a blood pressure, an oxygen concentration in the blood of the vehicle occupant or other conditions of the vehicle occupant. In addition to sensors installed in the vehicle, personal items, for example wearables (smartwatches, fitness trackers, heart rate sensor, peacemakers, etc.), belonging to the vehicle occupant can also be used to provide the second sensor values SW4, SW5, SW6. The second sensor values are referred to as direct parameters. They provide direct information on the attentiveness of the vehicle occupant, but are often more inaccurate on account of the difficulties associated with determining them.

In the exemplary embodiment, the sensor values SW4, SW5, SW6 are supplied to calculation rules BV2-1, ..., BV2-$m$ which are carried out on a computing unit 20 as software components. Only two calculation rules BV2-1, ..., BV2-$m$ are explicitly illustrated only by way of example in the present exemplary embodiment. Any desired number m of calculation rules BV2-1, ..., BV2-$m$ can be carried out on the computing unit 20. In other words, the number may be m≥1. For illustration purposes, the second sensor value SW4 is supplied to a calculation rule BV2-1 and the second sensor values SW5, SW6 are supplied to a calculation rule BV2-$m$ in FIG. 2.

Each of the calculation rules BV2-1, ..., BV2-$m$ determines a respective second fatigue indicator MW2-1, ..., MW2-$m$ from the second sensor value(s) SW4, SW5, SW6 supplied to it. In addition, a respective second metadata record MD2-1, ..., MD2-$m$ is assigned to each second fatigue indicator MW2-1, ..., MW2-$m$. The second metadata records MD2-1, ..., MD2-$m$ each comprise one or more items of information relating to the characteristics of the sensors which provide the sensor values SW4, SW5, SW6 and the second sensor values SW4, SW5, SW6 of which are processed in the respective second fatigue indicators MW2-1, ..., MW2-$m$. Information relating to the characteristics of the sensors is, in particular, an item of information relating to the availability of a sensor value SW4, SW5, SW6 and/or accuracy of the second sensor values SW4, SW5, SW6 at the time at which they are captured. The "quality" of the second fatigue indicators MW2-1, ..., MW2-$m$ can also be evaluated thereby. The provision of this information corresponds to the second step S20 in the sequence in FIG. 2.

The first fatigue indicators MW1-1, ..., MW1-$n$, the first metadata records MD1-1, ..., MD1-$n$ assigned to them and the second fatigue indicators MW2-1, ..., MW2-$m$ and the second metadata records MD2-1, ..., MD2-$m$ assigned to them are supplied to a computing unit 30 for further processing and for determining an overall fatigue indicator GMW.

The computing unit 10, the computing unit 20 and the computing unit 30 do not need to be computing units which are separate from one another. Rather, they may constitute a common computing unit.

The computing unit 30 uses the first and second metadata records MD1-1, ..., MD1-$n$ and MD2-1, ..., MD2-$m$ to determine respective weightings for weighting the first and second fatigue indicators MW1-1, ..., MW1-$n$ and MW2-1, ..., MW2-$m$ assigned to them. This step corresponds to method step S30 in FIG. 2. The quality of the determined fatigue indicators MW1-1, ..., MW1-$n$ and MW2-1, ..., MW2-$m$ is therefore taken into account when determining the overall fatigue indicator GMW. The first or second fatigue indicator is respectively weighted by means of a weighting factor determined from the information contained in the first or second data record assigned to it. A respective weighting parameter is therefore determined from the information relating to the characteristics of the sensors which is contained in the first metadata record MD1-1, ..., MD1-$n$ and the second metadata record MD2-1, ..., MD2-$m$, which weighting parameter is processed for the purpose of weighting the assigned first and second fatigue indicator MW1-1, ..., MW1-$n$ or MW2-1, ..., MW2-$m$. The overall fatigue indicator GMW representing the degree of fatigue of the vehicle occupant is then determined therefrom.

The weighting factors for weighting are preferably determined in this case at the runtime of the method and are optionally adapted in order to be able to take into account the current availability of individual sensor values, for example. Image losses as a result of shading or concealment can arise, for example, in the case of sensor values determined by means of image processing, with the result that a fatigue indicator determined therefrom would be distorted or would be of low significance.

In addition, it is possible to adapt the weighting by adapting the weighting factors on the basis of a personal profile determined for the vehicle occupant. This is made possible, for example, by virtue of the fact that fatigue indicators determined for a respective vehicle occupant over a multiplicity of journeys are stored and are adapted over time, together with their metadata records, to the vehicle occupant. For example, it is possible to take into account that a first vehicle occupant is able to drive the vehicle for a long period without the occurrence of fatigue. In contrast, it may be determined, for another vehicle occupant, that fatigue or an attention deficit already occurs after a comparatively short journey.

The overall fatigue indicator GMW can be determined by means of a rule-based method or by means of a machine learning method. In this case, a priori expert knowledge can be initially used, for example, to determine weights for the respective fatigue indicators. The weighting factors can then be adapted with an increasing period and increasing learning progress.

The overall fatigue indicator GMW is assigned to a classification value K1, ..., Kx by the computing unit 30 according to a predetermined scheme, wherein the classification value K1, ..., Kx is verified and optionally adapted by means of further assessment of one or more sensor values (for example the first sensor value SW3 in the exemplary embodiment). For example, a single, very reactive sensor value, for example the eyelid opening, can be used not only as an input variable for the fatigue indicator BV1-$n$ but rather can be analyzed together with the determined overall fatigue indicator GMW. If the vehicle occupant has been classified as sleeping (that is to say the degree of fatigue is high) by the overall fatigue indicator GMW, but his eyes are open again, the final classification is changed by one or more levels in the direction of awake.

The method according to the invention also additionally allows a first and/or a second sensor value to be processed when determining the overall fatigue indicator from the weighted first and second fatigue indicators MW1-1, ..., MW1-$n$ and MW2-1, ..., MW2-$m$. In the present exemplary embodiment, the second sensor value SW4 is additionally directly supplied to the computing unit 30 for immediate processing.

LIST OF REFERENCE SIGNS

MW1-1, ..., MW1-$n$ First fatigue indicators (n≥1)
MW2-1, ..., MW2-$m$ Second fatigue indicators (m≥1)
MD1-1, ..., MD1-$n$ First metadata records (n≥1)
MD2-1, ..., MD2-$m$ Second metadata records (m≥1)
SW1, SW2, SW3 First sensor value
SW4, SW5, SW6 Second sensor value
BV1-1, ..., BV1-$n$ Calculation rule (n≥1)

BV2-1, ..., BV2-m Calculation rule (m≥1)
GMW Overall fatigue indicator
K1, ..., Kx Classification value
10 Computing unit
20 Computing unit
30 Computing unit
S10 Method step
S20 Method step
S30 Method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for evaluating a degree of fatigue of a vehicle occupant in a vehicle, comprising the steps of:
    providing a first fatigue indicator determined from a first sensor value according to a first calculation rule, the first fatigue indicator representing a first degree of fatigue of the vehicle occupant, wherein the first sensor value represents a measured value of the vehicle and/or measured value relating to a current journey as measured by a first sensor;
    assigning a first metadata record to the first fatigue indicator, wherein the first metadata record represents a characteristic of the first sensor determined according to the first calculation rule;
    providing a second fatigue indicator determined from a second sensor value according to a second calculation rule, the second fatigue indicator representing a second degree of fatigue of the vehicle occupant, wherein the second sensor value represents physiological and/or physical parameters of the vehicle occupant as measured by a second sensor;
    assigning a second metadata record to the second fatigue indicator, wherein the second metadata record represents a characteristic of the second sensor determined according to the second calculation rule;
    determining an overall fatigue indicator representing an overall degree of fatigue of the vehicle occupant by weighting the first fatigue indicator and the second fatigue indicator based on the first metadata record and the second metadata record.

2. The method according to claim 1, wherein the characteristic of the first sensor and/or the second sensor, respectively, is an accuracy and/or an availability of the determined first sensor value and/or the second sensor value.

3. The method according to claim 1, wherein the weighting is selected to be greater, the higher the accuracy and/or availability of the first sensor value and/or the second sensor value.

4. The method according to claim 1, wherein the weighting is adapted at a runtim of the method.

5. The method according to claim 1, wherein a personal profile determined forth vehicle occupant is included in the weighting.

6. The method according to claim 1, wherein determining the overall fatigue indicator is further based on an additional first sensor value and/or an additional second sensor value.

7. The method according to claim 1, wherein the overall fatigue indicator is assigned to a classification value according to a predetermined scheme, and the classification value is verified and optionally adapted by further assessment of the first sensor value and/or the second sensor value.

8. The method according to claim 1, wherein the overall fatigue indicator is determined by a rule-based method.

9. The method according to claim 1, wherein the overall fatigue indicator is determined by machine learning.

10. A non-transitory computer-readable medium having software instructions stored thereon that, when executed by a computing unit of a device, cause the device to carry out a method of evaluating a degree of fatigue of a vehicle occupant, the method comprising:
    providing a first fatigue indicator determined from a first sensor value according to a first calculation rule, the first fatigue indicator representing a first degree of fatigue of the vehicle occupant, wherein the first sensor value represents a measured value of the vehicle and/or measured value relating to a current journey as measured by a first sensor;
    assigning a first metadata record to the first fatigue indicator, wherein the first metadata record represents a characteristic of the first sensor determined according to the first calculation rule;
    providing a second fatigue indicator determined from a second sensor value according to a second calculation rule, the second fatigue indicator representing a second degree of fatigue of the vehicle occupant, wherein the second sensor value represents physiological and/or physical parameters of the vehicle occupant as measured by a second sensor;
    assigning a second metadata record to the second fatigue indicator, wherein the second metadata record represents a characteristic of the second sensor determined according to the second calculation rule;
    determining an overall fatigue indicator representing an overall degree of fatigue of the vehicle occupant by weighting the first fatigue indicator and the second fatigue indicator based on the first metadata record and the second metadata record.

11. A device for evaluating a degree of fatigue of a vehicle occupant in a vehicle, comprising:
    a first sensor and a second sensor; and
    a computing unit which is configured to carry out the acts of:
        providing a first fatigue indicator determined from a first sensor value according to a first calculation rule, the first fatigue indicator representing a first degree of fatigue of the vehicle occupant, wherein the first sensor value represents a measured value of the vehicle and/or measured value relating to a current journey as measured by the first sensor;
        assigning a first metadata record to the first fatigue indicator, wherein the first metadata record represents a characteristic of the first sensor determined according to
    the first calculation rule;
        providing a second fatigue indicator determined from a second sensor value according to a second calculation rule, the second fatigue indicator representing a second degree of fatigue of the vehicle occupant, wherein the second sensor value represents physiological and/or physical parameters of the vehicle occupant as measured by the second sensor;
        assigning a second metadata record to the second fatigue indicator, wherein the second metadata record represents a characteristic of the second sensor determined according to the second calculation rule;
        determining an overall fatigue indicator representing an overall degree of fatigue of the vehicle occupant by weighting the first fatigue indicator and the second fatigue indicator based on the first metadata record and the second metadata record.

\* \* \* \* \*